р

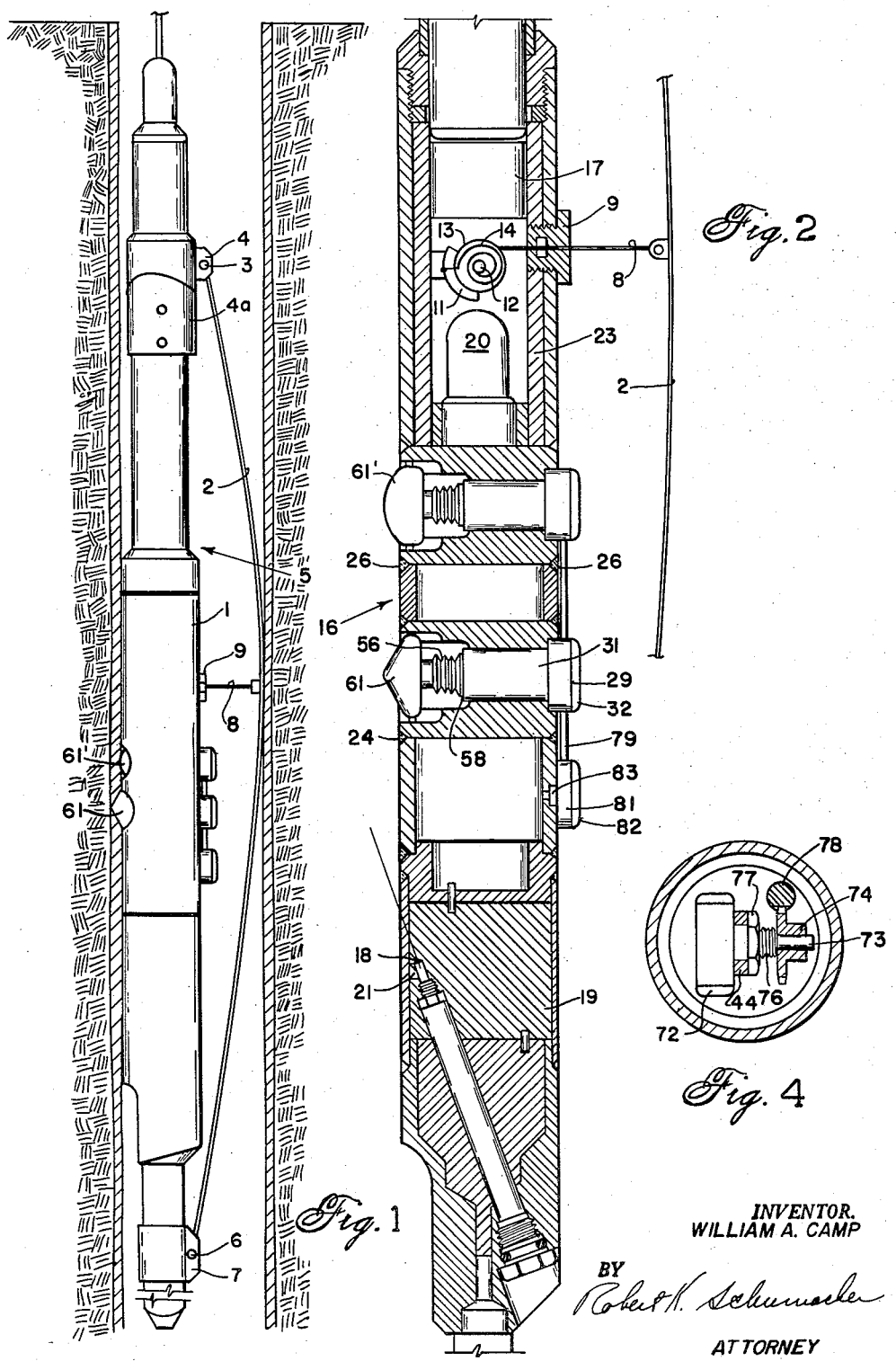

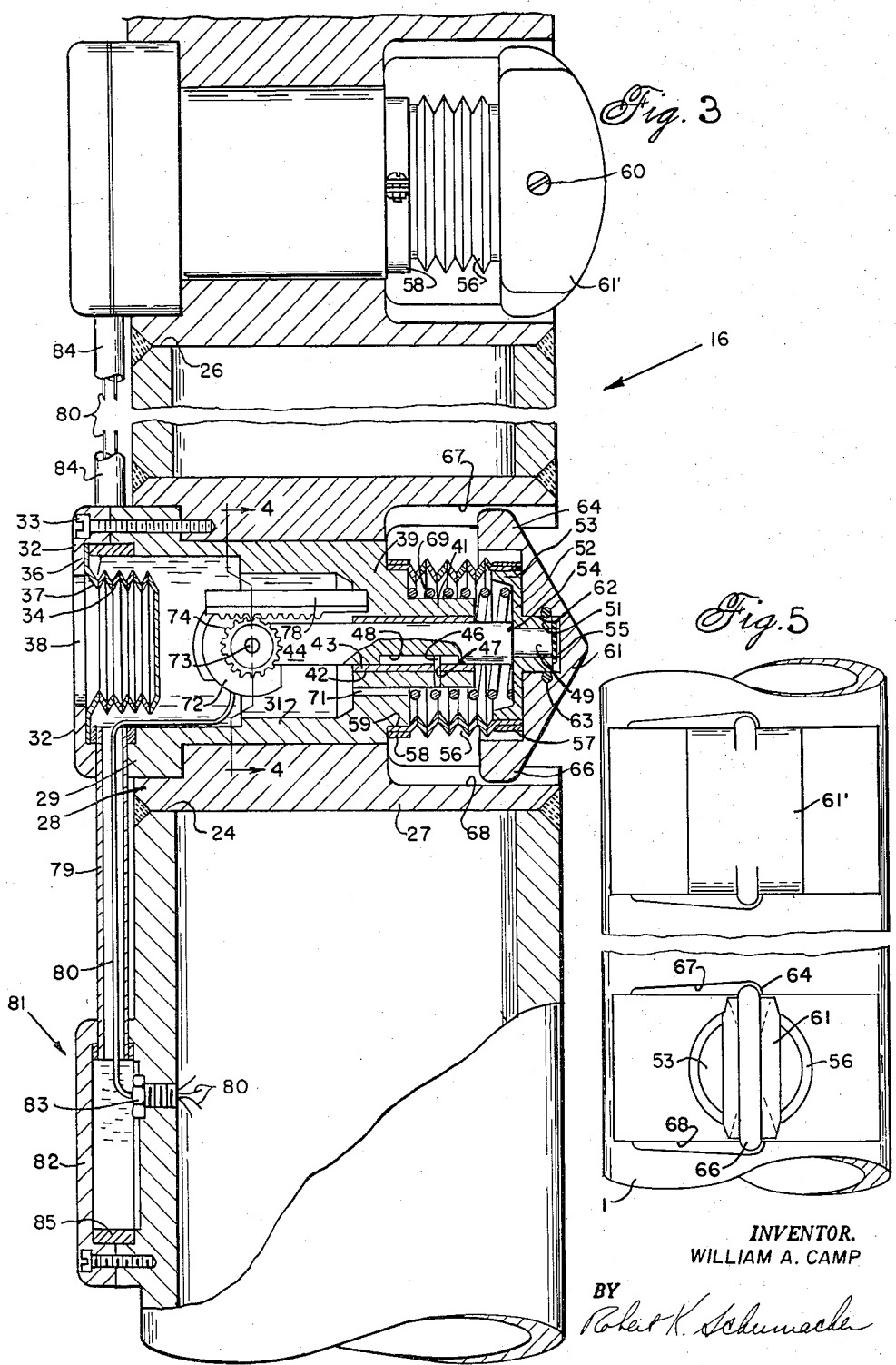

United States Patent Office 3,023,507
Patented Mar. 6, 1962

3,023,507
APPARATUS FOR MEASURING THE DISPLACEMENT OF A WELL TOOL FROM AN ADJACENT SURFACE
William A. Camp, Tulsa, Okla., assignor to Well Surveys, Incorporated, a corporation of Delaware
Filed Mar. 23, 1960, Ser. No. 17,022
11 Claims. (Cl. 33—178)

The present invention relates to well logging apparatus and more particularly to the structure of an apparatus for measuring the displacement of a well tool from an adjacent surface. The present application is related to copending patent application, Serial No. 840,569, filed on Sept. 17, 1959, by Arthur H. Youmans, entitled "Measurement of Stand-Off of a Decentralized Nuclear Well Logging Instrument," and assigned to the same assignee as the present invention.

In the aforesaid copending patent application, there is disclosed a decentralized well tool, conventionally employed in nuclear well logging systems, having associated therewith an apparatus for measuring the separation of a well tool from a bore hole wall and related quantities. The tool is provided with a bow spring caliper for measuring the diameter of the well and this measurement, in conjunction with the separation measurement, permits the true diameter of the well to be determined. In addition, the separation detector indicates the existence of a mud cake and its relative thickness thereby providing an indication of the relative porosities of the substrata and consequently, a determination of the delineation between strata as reflected by changes in porosity. If the separation detector is incorporated in a nuclear well logging tool, then it is possible to locate the detector between a source of nuclear emanations and a nuclear energy detector so that the tool-wall separation and information indicative of the thickness of the mud cake may be determined in the region in which the nuclear logging occurs and therefore, permits interpretation of the readings in the light of the information relating to tool-wall separation and mud cake thickness. In addition to the various measurements set forth above, other information may be obtained from the tool of the aforesaid application. Specifically, the character of the side wall of the well is investigated with regard to roughness and hardness, such information being of value in determining the nature of the strata.

The separation detector disclosed in the aforesaid copending application constitutes two "shoes" mounted in the well tool for movement generally perpendicular to the longitudinal axis of the tool. The shoes are closely spaced along the longitudinal axis of the tool and one of the shoes has a large flat surface so that it rides on the surface of the mud cake, while the other shoe has a sharp surface so that it penetrates the mud cake and extends into contact with the well wall. As set forth in the copending application, each shoe is provided with an apparatus for maintaining it in contact with a surface and for measuring its movement relative to the casing of the tool. The details of the mechanism for performing the above functions form the subject matter of the present application which has as a primary object the provision of a small, reliable and economical apparatus that is also rugged and long lived.

It is another object of the present invention to provide an apparatus for biasing a shoe outwardly from a well logging instrument into contact with an adjacent surface and for measuring the displacement of the shoe relative to the well tool, in which apparatus the pressure is maintained equal to the external pressure in the well so that the shoe may not be forced inwardly by a pressure external to the apparatus.

Yet another object of the present invention is to provide an apparatus for biasing a surface contacting shoe outwardly from a well tool, said apparatus being provided with bellows arrangements such that internal and external pressures are equalized and changes in volume with temperature are permitted, one of said bellows serving as a flexible seal between the shoe and the remainder of the apparatus.

It is another object of the present invention to provide an apparatus for biasing a surface engaging shoe outwardly from a well tool and for measuring the displacement of the shoe relative to the tool, which apparatus is sufficiently small to enable its insertion at any point in the tool as a complete and separate package.

Another object of the present invention is to provide an apparatus for biasing a surface contacting shoe outwardly from a well tool, said apparatus constituting a self-contained sealed unit which is readily removable from the well tool.

Another object of the present invention is to provide an apparatus for biasing a surface contacting shoe outwardly from a well tool, said apparatus constituting a self-contained unit in which all elements subject to injury by wear or impact, except the shoe, are disposed in a protected location interiorly of the well tool casing and are immersed in a lubricating fluid.

It is yet another object of the present invention to provide an apparatus for biasing outwardly from a well tool a surface contacting shoe and for measuring displacement of the shoe relative to the well tool, wherein the only parts of the apparatus subject to extreme wear are the shoes themselves and in which the shoes are readily replaceable without requiring access to any other part of the apparatus.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a view in elevation of a well tool in which the apparatus of the present invention may be incorporated;

FIGURE 2 is a cross-sectional view in elevation of the well tool illustrated in FIGURE 1;

FIGURE 3 is a cross-sectional view in elevation illustrating particularly the structure of the apparatus of the present invention;

FIGURE 4 is a partial cross-sectional view taken along section 4—4 of FIGURE 3; and FIGURE 5 is a view in elevation of the shoes which may be employed with apparatus of the present invention.

Referring specifically to FIGURES 1 and 2 of the accompanying drawings, there is illustrated a well tool 1 having a bow spring caliper 2 for maintaining a portion of the tool 1, as illustrated in FIGURE 1, against the wall of a well 5 in which the tool is disposed. The bow spring caliper 2 is pivotally secured at 3 to a sleeve 4 slidable along the well tool 1. The other end of the bow spring 2 is pivotally secured at 6 to a second sleeve 7 slidable along the well tool 1 and therefore, as the tool moves upwardly in the well and the diameter of the well 5 varies, the sleeve 4 is stopped by stop 4a and the sleeve 7 slides along the well tool casing to permit contraction and expansion of the bow spring 2 with variations in the diameter of the well.

A wire 8, for instance, piano wire, is secured to the bow spring 2 adjacent the center thereof and extends through the wall of the well tool 1 into the interior thereof. A packing member 9 is threaded into the wall of the well tool in order to provide a seal about the wire 8. A potentiometer 11 is disposed within the tool 1 and has its casing secured to the well tool. The wire 8 is wound about a drum 13 to which center shaft 12 of the potentiometer 11 is secured. The drum 13 is biased by a spiral spring 14 to maintain a force on the wire 8 so that as the wire moves with movement of the bow spring 2, the shaft 12 of the potentiometer is rotated with respect to the casing of the potentiometer. In consequence, a wiper, which is normally secured to the shaft 12, is rotated with respect to the resistive element of the potentiometer 11, and produces a variation in resistance, between the wiper and one end of the resistive element, which varies as a function of the movement of the bow spring and therefore, as a function of the diameter of the well. The particular arrangement for mounting the bow spring caliper and measuring its movement is exemplary only, and it is not intended to limit the scope of the invention to the details illustrated, since other conventional techniques may be readily employed.

The well tool 1 is divided into several sections in which the various components of the apparatus are disposed. More particularly, the apparatus for measuring the well tool and well wall separation, the thickness of the mud cake, and an indication of the roughness of the wall, is housed within a compartment 16, whereas the electronic circuitry which converts the measurements performed by the various sensing devices of the apparatus into electrical signals suitable for transmission to a surface station, is located in a compartment 17. A source 18 of radioactive material is disposed with a solid body of shielding material 19 having a window 21 which permits radioactive emanations to impinge upon the material forming the sides of the well in which the tool is located. A radioactive detector 20 is disposed in a compartment 23 and is spaced from the source 18 by such a distance that gamma rays back-scattered from the material being measured may impinge thereupon. The radiation source and radiation detector are completely conventional as are the electronic circuits disposed within the compartment 17, which circuits constitute amplifiers, discriminators, and telemetering means permitting the transmission of the various units of information to a surface station.

Referring now to FIGURES 3 and 4, the operating mechanisms which constitute the subject matter of the present application are arranged in section 16 of the well tool 1. These mechanisms which are identical are disposed in metallic sleeves 27 welded in longitudinally aligned transverse apertures 24 and 26 in the well tool casing. The left end of the sleeve 27, as viewed in FIGURE 3, has a section 28 of enlarged inner diameter which receives an enlarged head portion 29 of a hollow cylindrical body 31 disposed within the hollow sleeve 27. The body 31 is the housing for the operating mechanisms and is designed to permit removal of the apparatus from the well tool as a unit.

The enlarged head portion 29 of the cylindrical body 31 is open-ended and is provided with a cap 32 which may be secured to the portion 29 by a suitable means such as by bolts 33. The bolts 33 extend through the housing 31 into the sleeve 27 and constitute the means for retaining the housing 31 in the sleeve. A flexible bellows 34 extends partly into the opening in the body 31 particularly in the region of the enlarged head portion 29 and has a flared end 36 clamped between the inner surface of the cap 32 and an annular metallic ring 37 disposed within mating recesses in the inner circumference of the head portion 29 and the cap 32. The cap 32 is centrally apertured at 38 so that the bellows is subjected to the pressure within the well but prevents the well muds or fluids from entering the interior of the hollow cylindrical housing 31. The housing 31 terminates at its right end in an end wall 39 having a flat left surface extending generally parallel to the inner portion of the bellows 34. The end wall 39 has a cylindrical hub 41 extending outwardly therefrom to the right as viewed in FIGURE 3, and further has an axially extending aperture 42 which is coaxial with the aperture 24. A thin sleeve bearing 43 is disposed in the aperture 42 and is adapted to support a shaft 44 for reciprocating motion therein. A pin 46 is fastened in a transverse aperture 47 in the hub 41 and extends into a keyway 48 in the shaft 44 so as to permit reciprocating motion of the shaft 44 while preventing rotary motion thereof. The right end 49 of the shaft 44 is of reduced diameter and extends through a hub 51 projecting to the right from a plate 52 having a circumferential circular flange 53 extending to the left therefrom. The plate 52 is clamped between a shoulder 54, formed on the shaft 44 by the reduction in diameter of the portion 49 thereof, and a snap ring 55 which engages the end portion 49 of shaft 44 to the right of the hub 51. A bellows 56 is secured to the outer periphery of flange 53 by a circular ring 57 which may be retained in position as by bolting or force fitting or other suitable means. The left end of the bellows 56 is clamped between another ring 58 and a circumferential shoulder 59 formed at the right end of the cylindrical body 31 adjacent the region from which the hub 41 extends. It will be noted that the apparatus thus far described is self-contained and self-supporting and may be readily removed from the sleeve 27 by removal of the bolts 33.

A shoe 61, having either a flat face or a sharp edge depending upon whether it is intended to ride on the mud cake or pierce it, has a center cylindrical recess 62, formed in its left face, adapted to receive the hub 51 of the plate 52. A set screw 60 may be provided to secure the shoe 61 to the hub 51 so that the shoe may be readily removed when it becomes worn or it is desired to remove the housing from the sleeve 27. A sealing ring 63 is seated in an outward extension of the recess 62 so as to provide a fluid-tight seal between the shoe 61 and the hub 51. The shoe 61 is provided with a pair of oppositely disposed, vertically extending ears or guides 64 and 66 which are disposed in slots 67 and 68 formed on the interior of the surface of the sleeve 27. The cooperation of the guides 64 and 66 with the slots 67 and 68, respectively, prevents rotation of the shoe 61 with respect to the well tool and therefore, with respect to the shaft 44. A spring 69 is disposed between the right surface of body 31, just outwardly of the hub 41, and the plate 52, just inwardly of the flange 53, so as to bias the shoe 61 outwardly from the wall of the well tool 1.

The hollow region between the bellows 34 and 56 is completely sealed so as to exclude drilling muds and may be filled with a suitable electrically insulating and mechanically lubricating fluid so as to assure proper functioning of the apparatus. The region between the bellows 56 and the hub 41 communicates with the interior of the sleeve 31 by means of a plurality of drilled passages 71, only one of which is illustrated in FIGURE 3 of the accompanying drawings. The underlying reason for using the two bellows 34 and 56 is so that the pressure within the sleeve 27 is equal to the pressure within the well. By making the pressure within this region equal to the pressure within the well, the problem of preventing the well fluid from entering the region within the sleeve 27 is greatly reduced. More particularly, since the fluid within the sleeve 27 is at the same pressure as the well fluid, there is no residual force acting upon the seals, tending to unseat them and permit the well fluid to enter the apparatus. The utilization of the bellows 34 and 56 also permits changes in volume of the fluid as a result of temperature variations while the bellows 56 permits movement of the shoe 61 relative to the sealed system.

Attached to the end of the shaft 44 lying within the hollow cylindrical member 31 is a potentiometer 72, and reference is now made to FIGURE 4 of the accompanying drawings. The potentiometer 72 has a shaft 73 to which the potentiometer wiper (not illustrated) is secured and mounted on the shaft is a gear 74. The casing of the potentiometer is provided with the usual threaded hub 76 surrounding the shaft 73 and a nut 77 which threadedly engages the hub 76. The shaft 73 and hub 76 are disposed in an aperture in the shaft 44 and the nut 77 clamps the shaft between the main body of the potentiometer and the nut. A stationary gear rack 78 has one end secured in a recess in the end wall 39 of the cylindrical member 31 and extends parallel to the shaft 44 and engages the teeth of the gear 74. Therefore, as the shaft 44 reciprocates in response to movement of the shoe 61, the gear 74 and therefore, the shaft 73 are rotated so as to produce movement of the potentiometer wiper over a resistor disposed in and secured to the potentiometer body.

In order to connect the potentiometer 72 electrically to the electronic circuits contained in the tool 1, a hollow tube 79 has one end extending through semicircular, opposed recesses in the head portion 29 of the cylindrical member 31 and the cap 32 into the metallic ring 37. The other end of the tube 79 projects through a housing 81 extending outwardly from the well tool 1. The housing 81 is provided with a removable cap 82 generally of the same type as the cap 32. The tube 79 extends through semicircular, opposed recesses in the housing 81 and cap 82 and extends into a metallic annulus 85. Electrical conductors 80 which are connected to the contacts of the potentiometers 72 extend through the tube 79 and the housing 81 and through a feed-through 83 threaded into the wall of the tool 1. The tube 79 and the space defined by the housing 81 and cap 82 are completely filled with the same liquid which fills the sleeve 27 so that these areas are pressure equalized. The wires from the upper sensing mechanism disposed in the aperture 26 may be carried in a tube 84 to the interior of the housing 31 and thence through the tube 79 into the housing 81 so that both sets of wires may be connected through the feed-through 83 into the tool 1. The problem of maintaining a pressure differential between the pressurized portion of the system including the interior of the tube 79, etc., and the non-pressurized interior of the well tool 1 is negligible. Many well-known sealing techniques are suitable for maintaining a completely effective, fluid-tight seal between the two spaces while providing for electrical feed-through.

The sensing mechanisms illustrated in FIGURE 3 are identical in all respects with the exception of the specific shape of the shoes. For example, and reference is now made to FIGURE 5, the shoe 61' which is associated with the upper structure illustrated in FIGURE 3 may be flat and quite broad and specifically, may be almost of the same width as the well tool. In consequence, the shoe 61' rides on the mud cake to produce an indication of the location of the outer surface of the mud cake. A shoe 61 which is associated with the lower sensing mechanism as illustrated in FIGURE 3, may be quite sharp and therefore, readily penetrates the mud cake and contacts the actual side wall of the well. The difference in resistances of the potentiometers 72 associated with the lower and the upper sensing mechanisms of FIGURE 3 is indicative therefore of the thickness of the mud cake.

The mechanisms of the present invention are wholly self-contained units and are disposed completely within the cylindrical sleeve 27 which is welded to the casing of the well tool. All of the various operating mechanisms are completely sealed from exposure to the well fluids so that wear of the various operating mechanisms is minimized. Further, the pressure within the apparatus is maintained equal at all times, due to the pressure equalization features, to the external pressure of the well and therefore, no residual force is exerted upon the shoes which would tend to prevent them from maintaining contact with an adjacent surface. The only part of the apparatus which is subject to extensive wear is the shoe and this mechanism is readily removable by simple expedient of loosening the set screw 60. It will be noted that the shoes 61 and 61' present only sloping surfaces externally of the tool housing and therefore prevent jamming of the tool which might occur if a flat surface of the shoes were contacted by a small overhang of the adjacent formation. It is also important that the hollow portion of the sleeve 27 surrounding the bellows 56 is completely open and therefore, is capable of being cleaned easily. This may be accomplished by directing water from a bore into this region. Thus, as a result of excluding well fluid from the operating mechanisms, of minimizing the number of moving parts and of permitting the single member which is subjected to heavy wear to be replaced, and of permitting easy cleaning or removal of the mechanism, the apparatus of the invention is quite rugged and long lived and, as a result, constitutes a reliable measuring instrument.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In combination, an open-ended, hollow member, a bellows for closing one end of said member, a shaft means for supporting said shaft for reciprocating motion along an axis within said member, a shoe disposed adjacent the other end of said member and secured to said shaft, bellows means extending between said shoe and said hollow member for producing a seal across said other end of said member, means for biasing said shoe outwardly from said member, and means for producing an indication of the instantaneous position of said shaft.

2. In combination, an open-ended, hollow, cylindrical member, a bellows for closing one end of said member, a shaft, means for supporting said shaft for translatory motion along an axis approximately parallel to the axis of said member, a shoe disposed adjacent the other end of said member and secured to said shaft, bellows means secured to said shoe for providing a seal across said other end of said member, means for biasing said shoe outwardly from said member, a potentiometer having a movable, resistance varying member, and means for positioning said movable member in accordance with the instantaneous position of said shaft.

3. In combination, an open-ended, hollow member, a bellows for closing one end of said member, a translatable shaft, means for supporting said shaft for translatory motion along an axis within said member, a shoe disposed adjacent the other end of said member and secured to said shaft, bellows means secured to said shoe for providing a seal across said other end of said member, means for biasing said shoe outwardly from said member, a potentiometer having a body part and a rotatable shaft, said body part of said potentiometer being secured to said translatable shaft, a pair of cooperating motion transmitting elements, one of said elements being secured to said rotatable shaft and the other of said elements being secured to said member.

4. In combination, an open-ended, hollow member, a bellows for closing one end of said member, a shaft, means for supporting said shaft for translatory motion along an axis within said member, a shoe disposed adjacent the other end of said member and secured to said shaft, a seal for said other end of said member, said seal being secured to said shoe and said member, means for biasing said shoe outwardly from said member, and means for producing an indication of the instantaneous position of said shaft.

5. In combination, a first, hollow, cylindrical member having open ends, a second, hollow, cylindrical member having one open end and having an apertured end wall across the other end, said second cylindrical member being disposed in fluid tight engagement with and internally of said first cylindrical member, a first bellows secured across the open end of said second cylindrical member, a shaft disposed in an aperture in said end wall for translatory motion parallel to the axes of said members, a shoe disposed adjacent said end wall of said second cylindrical member and one end of said first cylindrical member, said shoe being secured to said shaft, a second bellows secured between said shoe and said end wall, means for urging said shoe outwardly from said first cylindrical member, a potentiometer having a movable, resistance varying element disposed in said second cylindrical member, and means for positioning said element in accordance with the instantaneous position of said shaft.

6. In combination, a first, hollow, cylindrical member having open ends, a second, hollow, cylindrical member having one open end and having an apertured end wall across the other end, said second cylindrical member being disposed in fluid tight engagement with and internally of said first cylindrical member, a first bellows secured across the open end of said second cylindrical member, a translatable shaft disposed in an aperture in said end wall for translatory motion parallel to the axes of said members, a shoe disposed adjacent said end wall of said second cylindrical member and one end of said first cylindrical member, said shoe being secured to said shaft, a second bellows secured between said shoe and said end wall, means for urging said shoe outwardly from said first cylindrical member, a potentiometer having a rotatable shaft and secured to said translatable shaft, a rack secured to said second cylindrical member, and a pinion secured to said rotatable shaft, said rack and pinion being in meshing relationship.

7. In combination, a first, hollow, cylindrical member, having open ends, a second, hollow, cylindrical member having one open end and having an apertured end wall across the other end, said second cylindrical member being disposed in fluid tight engagement with and internally of said first cylindrical member, a section of said second cylindrical member adjacent its open end extending outwardly from said first cylindrical member, a small tube communicating through an aperture in said section with the interior of said second cylindrical member, a first bellows secured across the open end of said second cylindrical member, a shaft disposed in an aperture in said end wall for translatory motion parallel to the axes of said members, a shoe disposed adjacent said end wall of said second cylindrical member and one end of said first cylindrical member, said shoe being secured to said shaft, a second bellows secured between said shoe and said end wall, means for urging said shoe outwardly from said first cylindrical member, a potentiometer having a movable resistance varying element disposed in said second cylindrical member, said potentiometer having at least one electrical lead, said lead extending through said tube, and means for positioning said element in accordance with the instantaneous position of said shaft, said cylindrical members being filled with a liquid insulating material.

8. In combination, a hollow, cylindrical housing having one open end and an apertured end wall at the other end, a flexible element closing said open end of said housing, a reciprocatable shaft extending through said end wall, means for biasing said shaft outwardly of said housing, a surface contacting member secured to said shaft externally of and spaced from said housing, a second flexible element extending between said member and said housing and providing a seal therebetween, and means disposed internally of said housing for sensing reciprocation of said shaft.

9. In combination, a hollow, cylindrical housing having one open end and an apertured end wall at the other end, a flexible element closing said open end of said housing, a reciprocatable shaft extending through said end wall, means for biasing said shaft outwardly of said housing, a circular plate secured to said shaft externally of and spaced from said housing, a second flexible element extending between and providing a seal between said housing and said plate, a surface contacting member secured to said plate, means providing a seal between said plate and said surface contacting member and means disposed internally of said housing for measuring the position of said shaft.

10. In combination, a well tool having a metal casing, a hollow sleeve disposed in a transverse bore in said casing, a hollow cylindrical housing having an enlarged open end and an end wall at its opposite end, said sleeve having an enlarged internal diameter adjacent one end to receive said enlarged end of said housing, means for releasably securing said housing to said sleeve, said end wall of said housing having a central outwardly extending hub, a reciprocatable shaft coaxial with said housing and extending through said end wall and hub, a plate secured to said shaft externally of said housing, a bellows extending between said housing and said plate, and a flexible member sealing the open end of said housing.

11. The combination according to claim 10, said sleeve having at least one longitudinally extending slot in its inner circumferential surface adjacent an end remote from the enlarged section of said housing, a surface contacting shoe removably secured to said shaft, said shoe having a member disposed in said slot for reciprocation therein.

References Cited in the file of this patent

UNITED STATES PATENTS

| | | |
|---|---|---|
| 2,267,110 | Kinley et al. | Dec. 23, 1941 |
| 2,497,990 | Huber et al. | Feb. 21, 1950 |
| 2,660,800 | Wiley | Dec. 1, 1953 |
| 2,833,046 | Jeglum | May 6, 1958 |